(12) United States Patent
Hoarau (10) Patent No.: US 12,518,096 B2
(45) Date of Patent: Jan. 6, 2026

(54) TECHNIQUES FOR AUTOMATICALLY MATCHING RECORDED SPEECH TO SCRIPT DIALOGUE

(71) Applicant: NETFLIX, INC., Los Gatos, CA (US)

(72) Inventor: Julien Hoarau, Los Angeles, CA (US)

(73) Assignee: NETFLIX, INC., Los Gatos, CA (US)

( * ) Notice: Subject to any disclaimer, the term of this patent is extended or adjusted under 35 U.S.C. 154(b) by 424 days.

(21) Appl. No.: 18/158,425

(22) Filed: Jan. 23, 2023

(65) Prior Publication Data
US 2023/0237266 A1     Jul. 27, 2023

Related U.S. Application Data

(60) Provisional application No. 63/302,480, filed on Jan. 24, 2022.

(51) Int. Cl.
*G10L 15/26*     (2006.01)
*G06F 40/284*     (2020.01)

(52) U.S. Cl.
CPC ............ *G06F 40/284* (2020.01); *G10L 15/26* (2013.01)

(58) Field of Classification Search
None
See application file for complete search history.

(56) References Cited

U.S. PATENT DOCUMENTS

| | | | | |
|---|---|---|---|---|
| 5,649,060 | A * | 7/1997 | Ellozy | G11B 27/10 704/235 |
| 7,877,774 | B1 * | 1/2011 | Basso | G06F 16/41 725/115 |
| 2005/0159957 | A1 * | 7/2005 | Roth | G10L 15/26 704/276 |
| 2005/0228663 | A1 * | 10/2005 | Boman | G10L 15/26 704/235 |
| 2007/0233486 | A1 * | 10/2007 | Griggs | G10L 15/26 704/251 |

(Continued)

OTHER PUBLICATIONS

Speech-to-Text request construction, Google Cloud, retrieved on Feb. 16, 2023, pp. 1-15. https://cloud.google.com/speech-to-text/docs/speech-to-text-requests.

(Continued)

*Primary Examiner* — Neeraj Sharma
(74) *Attorney, Agent, or Firm* — Artegis Law Group, LLP (57) ABSTRACT

In various embodiments a dialogue matching application performs speech recognition operations on an audio segment to generate a sequence of words. The dialogue matching application determines a first dialogue match between a first subsequence of words included in the sequence of words and a script line included in a set of script lines. The dialogue matching application determines a second dialogue match between a second subsequence of words included in the sequence of words and the script line. The dialogue matching application receives, via a graphical user interface (GUI), an event that corresponds to an interaction between a user and an interactive GUI element. The dialogue matching application extracts a portion of the audio segment from a session recording based on the event to generate an audio clip that corresponds to both the script line and either the first subsequence or words or the second subsequence of words.

20 Claims, 5 Drawing Sheets

(56) References Cited

U.S. PATENT DOCUMENTS

| | | | | |
|---|---|---|---|---|
| 2009/0119101 A1* | 5/2009 | Griggs | G10L 15/26 | 704/235 |
| 2011/0239119 A1* | 9/2011 | Phillips | G06F 3/0482 | 715/731 |
| 2012/0323925 A1* | 12/2012 | Fitzsimmons | G06F 16/48 | 707/741 |
| 2013/0060572 A1* | 3/2013 | Garland | G11B 27/10 | 704/E15.005 |
| 2017/0345411 A1* | 11/2017 | Raitio | G10L 13/06 | |
| 2022/0028390 A1* | 1/2022 | Poznanski | G10L 15/19 | |
| 2022/0083741 A1* | 3/2022 | Hu | G06F 16/489 | |

OTHER PUBLICATIONS

Turnball, Doug, "BM25 The Next Generation of Lucene Relevance", Blog, Oct. 16, 2015, pp. 1-8 https://opensourceconnections.com/blog/2015/10/16/bm25-the-next-generation-of-lucene-relevation/.

* cited by examiner

TECHNIQUES FOR AUTOMATICALLY MATCHING RECORDED SPEECH TO SCRIPT DIALOGUE

CROSS-REFERENCE TO RELATED APPLICATIONS

This application claims priority benefit of the United States Provisional Patent Application titled, "MATCHING DIALOGUE TO DETECTED SPEECH," filed on Jan. 24, 2022 and having Ser. No. 63/302,480. The subject matter of this related application is hereby incorporated herein by reference.

BACKGROUND

Field of the Various Embodiments

The various embodiments relate generally to computer science and to audio technology and, more specifically, to techniques for automatically matching recorded speech to script dialogue.

Description of the Related Art

During a recording session for a dialogue track of an animated film, a voice actor reads dialogue for a particular character from a script, while sometimes optionally improvising, a director provides feedback to the voice actor, and a script coordinator takes written notes of the feedback. In practice, a voice actor often ends up repeatedly reading the same lines of script dialogue in different ways and sometimes at different times during a given recording session. Eventually, the director designates one of the recorded attempts or "takes" as a production take, and that production take is then incorporated into the dialogue track for the film. One particular challenge associated with generating dialogue tracks for animated films is that identifying all of the different production takes included in a given session recording after-the-fact can be quite difficult. In particular, the feedback notes usually map each production take to specific lines of the relevant script. However, these notes typically specify only an approximate time range within the session recording when a given production take occurred. Consequently, determining the proper portions of the session recording to incorporate into the dialogue track can be difficult.

In one approach to identifying production takes within a session recording after-the-fact, an editor loads the session recording into audio editing software after the recording session has completed. For each production take specified in the feedback notes, the editor interacts with the audio editing software to iteratively playback portions of the session recording within and proximate to the approximate time range mapped to the production take in the feedback notes. As the audio editing software plays back the different portions of the session recording, the editor listens for at least partial match(es) between the recorded spoken dialogue and the corresponding lines of script in order to locate the actual production take within the session recording. Subsequently, the editor instructs the audio editing software to extract and store the identified production take as the production audio clip for the corresponding lines of script.

One drawback of the above approach is that, because tracking each production take involves actually playing back different portions of the session recording, a substantial amount of time (e.g., 4-5 days) can be required to extract production audio clips from a session recording for a typical animated film. Another drawback of the above approach is that tracking production takes based on approximate time ranges is inherently error-prone. In particular, because multiple takes corresponding to the same script lines are oftentimes recorded in quick succession during a recording session, an approximate time range may not unambiguously identify a given production take. If an inferior take is mistakenly identified as a production take, then the quality of the dialogue track is negatively impacted.

As the foregoing illustrates, what is needed in the art are more effective techniques for tracking different production takes for inclusion in a dialogue track.

SUMMARY

One embodiment sets forth a computer-implemented method for automatically generating audio clips. The method includes performing one or more speech recognition operations on a first audio segment to generate a first sequence of words; determining a first dialogue match between a first subsequence of words included in the first sequence of words and a first script line included in a set of script lines; determining a second dialogue match between a second subsequence of words included in the first sequence of words and the first script line; receiving, via a graphical user interface (GUI), a first event that corresponds to a first interaction between a user and a first interactive GUI element; extracting a first portion of the first audio segment from a session recording based on the first event, where the first portion of the first audio segment corresponds to either the first subsequence of words or the second subsequence of words; and generating a first audio clip that corresponds to the first script line based on the first portion of the first audio segment.

At least one technical advantage of the disclosed techniques relative to the prior art is that, with the disclosed techniques, the amount of time required to extract production audio clips from a session recording can be substantially reduced. In that regard, the disclosed techniques enable a user to designate a production take during a recording session simply by selecting transcribed spoken lines that are automatically matched to actual script lines and displayed within a graphical user interface. Because each transcribed spoken line is derived from a different portion of the session recording, a production audio clip for the corresponding script line can be automatically and efficiently generated. Another advantage of the disclosed techniques is that, because production takes are precisely and directly tracked within the session recording via selections of transcribed spoken lines, the likelihood that any production take is misidentified is substantially decreased relative to prior art techniques. Consequently, the quality of the dialogue track can be improved relative to what can usually be achieved using conventional techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
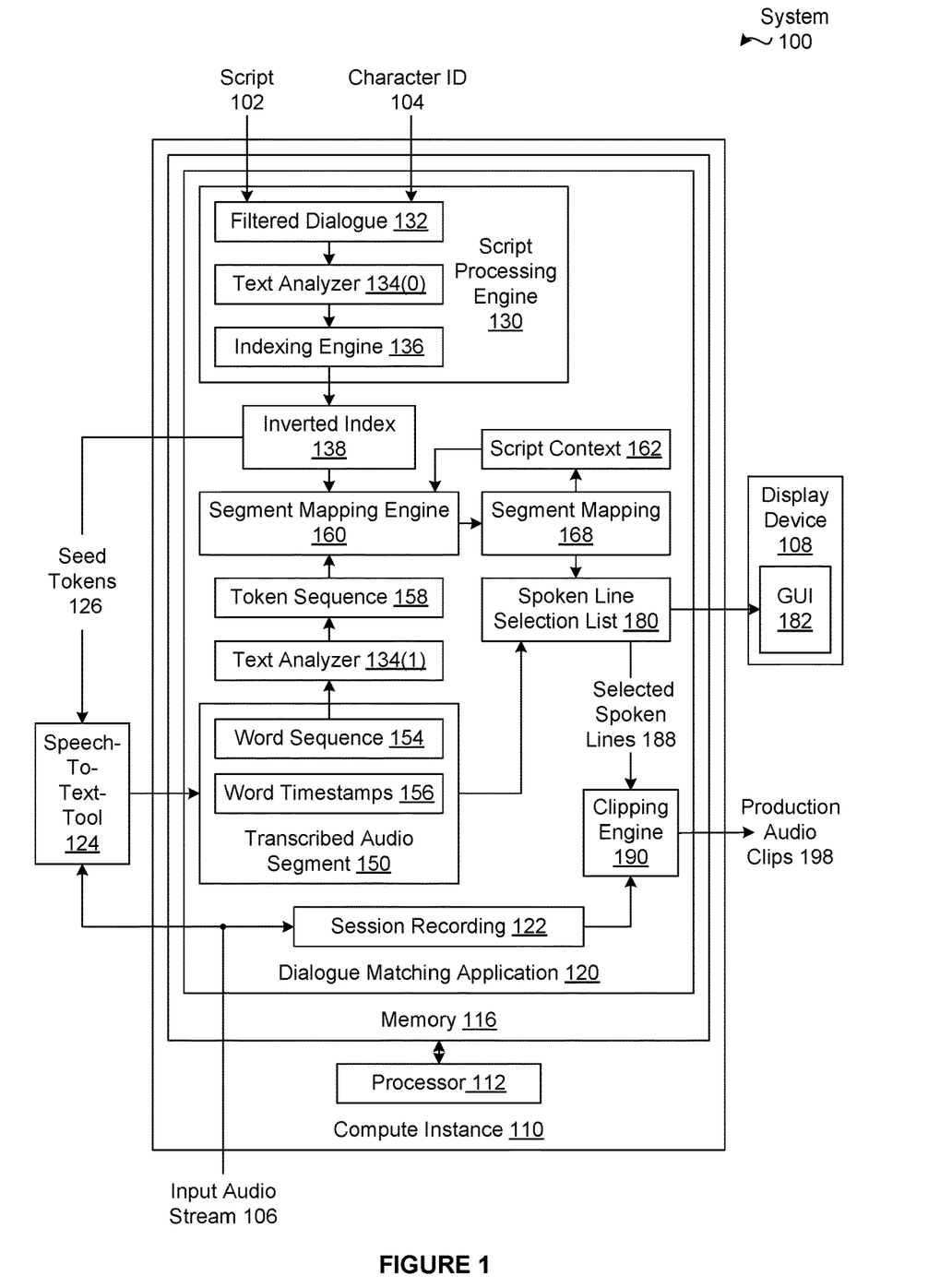
- FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110, a display device 108, and a speech-to-text tool 124. In some other embodiments, the system 100 can include any number and/or types of other compute instances, other display devices, other input devices, output devices, input/output devices, search engines, or any combination thereof. In the same or other embodiments, any number of touchscreen devices can supplement or replace the display device 108.

Any number of the components of the system 100 can be distributed across multiple geographic locations or implemented in one or more cloud computing environments (e.g., encapsulated shared resources, software, data) in any combination. In some embodiments, the compute instance 110 and/or zero or more other compute instances can be implemented in a cloud computing environment, implemented as part of any other distributed computing environment, or implemented in a stand-alone fashion.

As shown, the compute instance includes, without limitation, a processor 112 and a memory 116. In some embodiments, each of any number of other compute instances can include any number of other processors and any number of other memories in any combination. In particular, the compute instance 110 and/or one or more other compute instances can provide a multiprocessing environment in any technically feasible fashion.

The processor 112 can be any instruction execution system, apparatus, or device capable of executing instructions. For example, the processor 112 could comprise a central processing unit, a graphics processing unit, a controller, a microcontroller, a state machine, or any combination thereof. The memory 116 stores content, such as software applications and data, for use by the processor 112.

The memory 116 can be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

As shown, in some embodiments, the compute instance 110 is connected to the display device 108. The display device 108 can be any type input device that can be configured to display any amount and/or types of visual content on any number and/or types of display screens in any technically feasible fashion. In some embodiments, the display device 108 is replaced or supplemented with a touchscreen device that can be configured to both receive input and display visual content via any number and/or types of touchscreens.

As shown, the compute instance 110 receives an input audio stream 106. from any type of audio input device (e.g., a microphone) in any technically feasible fashion. The compute instance 110 receives input from one or more associated user(s) from any number and/or types of input devices and/or any number and/or types of input/output devices in any technically feasible fashion. Some examples of input devices are a keyboard, a mouse, and a microphone.

In some embodiments, the compute instance 110 can be integrated with any number and/or types of other devices (e.g., one or more other compute instances and/or the display device 108) into a user device. Some examples of user devices include, without limitation, desktop computers, laptops, smartphones, and tablets.

In general, the compute instance 110 is configured to implement one or more software applications. For explanatory purposes only, each software application is described as residing in the memory 116 of the compute instance 110 and executing on the processor 112 of the compute instance 110. In some embodiments, any number of instances of any number of software applications can reside in the memory 116 and any number of other memories associated with any number of other compute instances and execute on the processor 112 of the compute instance 110 and any number of other processors associated with any number of other compute instances in any combination. In the same or other embodiments, the functionality of any number of software applications can be distributed across any number of other software applications that reside in the memory 116 and any number of other memories associated with any number of other compute instances and execute on the processor 112 and any number of other processors associated with any number of other compute instances in any combination. Further, subsets of the functionality of multiple software applications can be consolidated into a single software application.

In particular, the compute instance 110 is configured to track production portions of a recording session within a session recording 122. During the voice recording session a voice actor reads dialogue for a particular character from a script and optionally improvises while a director provides feedback. Typically, a voice actor often ends up repeatedly reading the same lines of script dialogue in different ways and sometimes at different times during the recording session. Eventually, the director verbally designates one of the recorded attempts or "takes" as a production take, thereby indirectly designating a corresponding "production" portion of the session recording 122 for inclusion in the dialogue track.

As described in greater detail previously herein, in a conventional approach to identifying production takes within a session recording, an editor uses audio editing software to iteratively playback portions of the session recording within and proximate to each approximate time range mapped to each production take in the feedback notes. As the audio editing software plays back the different portions of the session recording, the editor listens for at least partial match(es) between the recorded spoken dialogue and the corresponding lines of script in order to locate the actual production takes within the session recording. The editor then uses the audio editing software to extract and store the identified production takes as production audio clips for the corresponding lines of script.

One drawback of the above approach is that, because tracking each production take involves actually playing back different portions of the session recording, a substantial amount of time (e.g., 4-5 days) can be required to extract production audio clips from a session recording for a typical animated film. Another drawback of the above approach is that tracking production takes based on approximate time ranges is that an approximate time range may not unambiguously identify a given production take. If an inferior take is mistakenly identified as a production take, then the quality of the dialogue track is negatively impacted.

Tracking Production Takes Included in Session Recordings

To address the above problems, the system 100 includes, without limitation, a dialogue matching application 120 and the speech-to-text tool 124. As described in greater detail below, the dialogue matching application 120 records and configures the speech-to-text tool 124 to transcribe the input audio stream 106 in real-time during a recording session. In some embodiments, the dialogue matching application 120 implements full-text search, relevance scoring, context-based sorting, and text similarity estimation techniques to identify transcribed spoken lines that match lines of dialogue included in the script 102 as well as transcribed spoken lines that do not match lines of dialogue included in the script 102 (e.g., ad-libbed lines).

The dialogue matching application 120 displays any number and/or types of GUI elements within a GUI 182 to enable a user to view the transcribed spoken lines and matched script lines, select transcribed spoken lines that correspond to production takes, and trigger the dialogue matching application 120 to generate production audio clips 198 for the production takes. The GUI 182 can be any type of GUI that is displayed on any number and/or types of display devices in any technically feasible fashion. As shown, in some embodiments, the GUI 182 is displayed on the display device 108. Notably, the dialogue matching application 120 automatically associates (e.g., via a file naming-convention) production audio clips that correspond to matched transcribed spoken lines with the corresponding matched script lines.

As shown, in some embodiments, the dialogue matching application 120 resides in the memory 116 of the compute instance 110 and executes on the processor 112 of the compute instance 110. In the same or other embodiments, the dialogue matching application 120 includes, without limitation, a script processing engine 130, a text analyzer 134(1), a segment mapping engine 160, and a clipping engine 190. The text analyzer 134(1) and a text analyzer 134(0) that is included in the script processing engine 130 are different instances of a single software application that is also referred to herein as a text analyzer 134.

Prior to the recording session, the script processing engine 130 generates an inverted index 138 based on the script 102 and a character identifier (ID) 104. As shown, the script processing engine 130 includes, without limitation, the text analyzer 134(0) and an indexing engine 136. In some embodiments, text analyzer 134(0) and the indexing engine 136 are implemented using a full-text search engine library (not shown).

As shown, the script processing engine 130 performs any number and/or types of filtering operations on the script 102 based on the character ID 104 to generate filtered dialogue 132 that includes, without limitation, each line of dialogue included in the script 102 that is spoken by the character identified by the character ID 104 (e.g., a character name). For explanatory purposes, the lines of dialogue included in the filtered dialogue 132 are also referred to herein as "script lines."

The text analyzer 134(0) performs any number and/or types of tokenization operations on the filtered dialogue 132 to convert each script line to a different token sequence. As used herein, "tokenization" operations include any number and/or types of operations that modify text to facilitate information retrieval and comparisons. Some examples of tokenization operations include normalization operations (e.g., lower-casing operations), stemming operations (e.g., reducing a derived word to a base form), filtering operations (e.g., removing stop words), and removing repeated letters in a word (e.g., replacing SSSTTTOOOOPPPPPPP with STOP). For explanatory purposes, a token sequence corresponding to a script line is also referred to herein as a "tokenized script line."

As shown, the indexing engine 136 performs any number and/or types of indexing operations on each of the script lines included in the filtered dialogue 132 to generate the inverted index 138. The inverted index 138 is a data structure that stores a mapping from tokens to tokenized script lines that contain the tokens (a mapping between the tokens and the tokenized script lines). In some other embodiments, the indexing engine 136 can generate any other type of index (e.g., a forward index that stores a mapping from tokenized script lines to tokens) instead of the inverted index 138 and the techniques described herein are modified accordingly.

As shown, in some embodiments, the script processing engine 130 provides any number of the tokens included in the tokenized script lines to the speech-to-text tool 124 as seed tokens 126. The script processing engine 130 can select the seed tokens 126 in any technically feasible fashion. The speech-to-text tool 124 can implement any number and/or types of speech recognition algorithms and/or speech recognition operations to transcribe speech to text and provide any amount and/or types of associated metadata (e.g., timestamps).

Throughout the recording session, the dialogue matching application 120 receives the input audio stream 106 corresponding to words spoken by a voice actor that is reading script lines and optionally modifying script lines and/or ad-libbing lines that are not included in the filtered dialogue 132. As shown, the dialogue matching application 120 records the input audio stream 106 in real-time to incrementally generate the session recording 122. The dialogue matching application 120 also configures the speech-to-text tool 124 to transcribe audio segments of the input audio stream 106 in real-time to generate transcribed audio segments. As used herein, each "audio segment" is a continuous portion of speech that is bounded by pauses or silences in audio that are longer than a configurable segment pause threshold.

Throughout the recording session, the speech-to-text tool 124 and the dialogue matching application 120 generate and process, respectively, a sequence of transcribed audio segments corresponding to a sequence of audio segments within the input audio stream 106 and therefore the session recording 122. For explanatory purposes, FIG. 1 depicts the speech-to-text tool 124 and the dialogue matching application 120 in the context of generating and processing, respectively, a transcribed audio segment 150 that corresponds to one audio segment in the input audio stream 106.

As shown, the transcribed audio segment 150 includes, without limitation, a word sequence 154 and word timestamps 156. The word sequence 154 is a sequence of transcribed spoken words that can correspond to any number of spoken lines. The word timestamps 156 specify a start timestamp and an end timestamp for each word in the word sequence 154. As used herein, a "timestamp" can be any type of metadata (e.g., a tag) that precisely identifies where in the session recording 122 a corresponding event occurs. For instance, in some embodiments, a start timestamp for a transcribed spoken word specifies a time offset (e.g., in hours, minutes, and seconds) from the start of the session recording 122. where the voice actor began to speak the corresponding word.

As shown, the dialogue matching application 120 configures the text analyzer 134(1) to convert the word sequence 154 to a token sequence 158. As noted previously herein for the text analyzer 134(0), in some embodiments, the text analyzer 134(1) is implemented using a full-text search engine library. The token sequence 158 is a sequence of any number of tokens. In some embodiments, the script processing engine 130 and the dialogue matching application 120 configure the text analyzer 134(0) and the text analyzer 134(1) to perform the same number and types of tokenization operations to facilitate dialogue matching.

As shown, the segment mapping engine 160 generates the segment mapping 168 based on the inverted index 138, the token sequence 158 and the script context 162. Although not shown, in some embodiments, a portion of the functionality of the segment mapping engine 160 is implemented using a full-text search engine library. The segment mapping engine 160 can perform any number and/or types of dialogue matching operations to generate a segment mapping 168 based on the token sequence 158, the inverted index 138, and a script context 162.

As described in greater detail below in conjunction with FIG. 2, in some embodiments, the segment mapping engine 160 executes a recursive matching process that incrementally partitions the token sequence 158 into N different contiguous and non-overlapping subsequences that each correspond to a different spoken line, where N can be any integer greater than zero. For explanatory purposes, each of the N subsequences is also referred to herein as a "tokenized spoken line." During the recursive matching process, the segment mapping engine 160 identifies matching tokenized script lines for any number (including zero) of the tokenized spoken lines.

For explanatory purposes, if the segment mapping engine 160 identifies a matching tokenized script line for a tokenized spoken line, then the tokenized spoken line and the corresponding spoken line are also referred to herein as a matched tokenized spoken line and a matched spoken line, respectively. Otherwise, the tokenized spoken line and the corresponding spoken line are also referred to herein as an unmatched tokenized spoken line and an unmatched spoken line, respectively.

The segment mapping engine 160 generates N different spoken line specifications (not shown in FIG. 1) corresponding to the N tokenized spoken lines. For each unmatched tokenized spoken line, the segment mapping engine 160 generates a spoken line specification that includes a spoken line ID and the unmatched tokenized spoken line. For each matched tokenized spoken line, the segment mapping engine 160 generates a spoken line specification that includes a spoken line ID, the matched tokenized spoken line, a script line ID corresponding to the matched tokenized script line, and the tokenized script line.

The segment mapping engine 160 orders the spoken line specification(s) in accordance with the token sequence 158 to generate the segment mapping 168. Importantly, the segment mapping engine 160 can recursively match different subsequences of the token sequence 158 and therefore different portions of the corresponding audio segment to different script lines and/or different takes of the same script line As persons skilled in the art will recognize, the order of spoken lines in a recording session is typically similar to the order of the scripted lines in the filtered dialogue 132. Accordingly, in some embodiments, the dialogue matching application 120 uses the script context 162 to track the most recently spoken "matched" script line within the filtered dialogue 132 as per the last segment mapping generated by the segment mapping engine 160. And the segment mapping engine 160 implements one or more heuristics based on the script context 162 in order to increase the accuracy of the recursive matching process.

As persons skilled in the art will recognize, the order of spoken lines in a recording session is typically similar to the order of the script lines in the filtered dialogue 132. Accordingly, in some embodiments, the dialogue matching application 120 tracks the last matched script line via the script context 162, and the segment mapping engine 160 implements heuristics based on the script context 162 that can increase the accuracy of the recursive matching process.

At the start of the recording session, the dialogue matching application 120 initializes the script context 162 to none. The dialogue matching application 120 subsequently and repeatedly updates the script context 162 to reflect the segment mapping for each token sequence. If the segment mapping 168 does not identify any matched script lines, then the dialogue matching application 120 sets the script context 162 to none. Otherwise, the dialogue matching application 120 sets the script context 162 to the line number of the most recently spoken matched script line as per the segment mapping 168.

As referred to herein, a "dialogue match" is a match between a portion of the session recording 122 and a script line included in the filtered dialogue 132. A dialogue match can be specified directly between a subsequence of the word sequence 154 (e.g., a spoken line) and a script line or indirectly between a subsequence of the token sequence 158 (e.g., a tokenized spoken line) and a tokenized script line.

In particular, if the segment mapping 168 does not specify any dialogue matches, then the dialogue matching application 120 sets the script context 162 to none. Otherwise, the dialogue matching application 120 sets the script context 162 to the last matched script line specified via the segment mapping 168. Accordingly, at any given time, the script context 162 is equal to either the line number of a previously matched script line or none.

As shown, the dialogue matching application 120 updates a spoken line selection list 180 to reflect the segment mapping 168 based on the segment mapping 168 and the transcribed audio segment 150. To reflect the segment mapping 168, the dialogue matching application 120 adds a start timestamp, an end timestamp, and a selection flag initialized to false to each spoken line specification included in the segment mapping 168 to generate a corresponding spoken line description.

The dialogue matching application 120 determines the start timestamps and the end timestamps for each spoken line based on the word timestamps 156. For each spoken line specification, the dialogue matching application 120 sets the start timestamp and the end timestamp equal to the start timestamp of the first word in the spoken line and the end timestamp of the last word in the spoken line. The dialogue matching application 120 then appends each spoken line description to the spoken line selection list.

More generally, the dialogue matching application 120 initializes the spoken line selection list 180 to none and subsequently and repeatedly updates the spoken line selection list 180 based on each segment mapping generated by the segment mapping engine 160 and the corresponding transcribed audio segment.

As shown, the dialogue matching application 120 displays any number and/or types of GUI elements within the GUI 182 to visually represent the spoken line selection list 180. In some embodiments, during each recording session, the dialogue matching application 120 enables a user to view the spoken line selection list 180, select different spoken lines specified in the spoken line selection list 180 as production takes for inclusion in a dialogue track, trigger the generation of one or more production audio clips, and optionally modify the spoken line selection list 180 (including the spoken line descriptions) via the GUI 182.

For instance, in some embodiments, the dialogue matching application 120 can display, re-display, or cease to display each of any number of GUI elements within the GUI 182 to reflect changes to the spoken line selection list 180. Importantly, one or more of the GUI elements are interactive GUI elements. Each interactive GUI element enables one or more types of user interactions that automatically trigger corresponding user events. In the context of an interactive GUI element, a "user interaction" refers herein to an interaction between a user and the interactive GUI element. Some examples of types of interactive GUI elements include, without limitation, scroll bars, buttons, text entry boxes, drop-down lists, and sliders.

In some embodiments, the dialogue matching application 120 displays zero or more interactive GUI elements and/or zero or more non-interactive GUI elements within the GUI 182 to visually indicate any number of dialogue matches. In the same or other embodiments, each dialogue match is a match between a subsequence of words in a spoken line and at least a portion of a script line.

The dialogue matching application 120 can perform any number and/or types of operations in response to any number and/or types of user events received via the GUI 182, a timeout event, optionally any number and/or types of other events, and optionally any number and/or types of triggers. In some embodiments, the dialogue matching application 120 can display, re-display, or cease to display each of any number of GUI elements within the GUI 182 in response to user events received via the GUI 182.

In some embodiments, the dialogue matching application 120 sets the selection flag included in an spoken line description to true or false in response to a user event that corresponds to an interaction between a user and an interactive GUI element. For example, the dialogue matching application 120 could set the selection flag included in an spoken line description to true or false in response to user events that are triggered when an associated "production take" button displayed within the GUI 182 is selected and deselected, respectively.

In some embodiments, the dialogue matching application 120 generates the production audio clips 198 in response to a "generate production audio clips" user event that is triggered whenever a "generate production audio clips" displayed within the GUI 182 is clicked and/or an audio timeout event is triggered. In the same or other embodiments, an audio timeout event that is triggered when the amount of time that has elapsed since the dialogue matching application 120 has received input audio stream 106 exceeds an audio timeout limit.

In some embodiments, in response to a "generate production audio clips" user event received via the GUI 182 or an audio time out event, the clipping engine 190 generates the production audio clips 198 based on selected spoken lines 188. The selected spoken lines 188 are a subset of the spoken line descriptions that are included in the spoken line selection list 180 and have selection flags that are set to true. The selected spoken lines 188 identify spoken lines that are selected for inclusion in a dialogue track.

For each of the selected spoken lines 188, the clipping engine 190 extracts a portion of the session recording 122 from the corresponding start timestamp through the corresponding end timestamp. As used herein, "extracting" a portion of the session recording 122 refers to generating a copy of the corresponding portion of the session recording 122. The clipping engine 190 then generates a production audio clip that includes the extracted portion of the session recording 122 and is associated with any amount and/or types of distinguishing data with the production audio clip in any technically feasible fashion.

For instance, in some embodiments, the clipping engine 190 determines a unique filename for the production audio clip based on a naming convention and any amount and/or types of distinguishing data associated with the selected spoken line. Some examples of distinguishing data are spoken line ID, start times, end times, and matched script line IDs (e.g., line numbers within the filtered dialogue 132). The clipping engine 190 then stores a copy of the portion of the session recording 122 corresponding to the selected spoken line in an audio file identified by the filename.

Advantageously, the dialogue matching application 120 enables a user to designate production takes during a recording session simply by selecting transcribed spoken lines that are automatically derived from and mapped to (via timestamps) the proper portions of the session recording. Consequently, the amount of time required to extract the production audio clips 198 from the session recording 122 can be substantially reduced relative to prior art techniques that required actually listening to portions of the session recording 122 to map production takes to the proper portions of the session recording. Another advantage of the disclosed techniques is that because production takes are precisely tracked within the session recording 122 based on corresponding timestamps included in the word timestamps 156, the likelihood that any production take is misidentified is substantially decreased relative to prior art techniques. Consequently, the quality of the dialogue track can be improved relative to what can usually be achieved using conventional techniques.

Note that the techniques described herein are illustrative rather than restrictive and may be altered without departing from the broader spirit and scope of the invention. Many modifications and variations on the functionality provided by the dialogue matching application 120, the text analyzer 134(0), the text analyzer 134(1), the segment mapping engine 160, the script processing engine 130, the indexing engine 136, the clipping engine 190, and the speech-to-text tool 124 will be apparent to those of ordinary skill in the art without departing from the scope and spirit of the described embodiments. In some embodiments, the inventive concepts described herein in the context of the dialogue matching application 120 can be practiced without any of the other inventive concepts described herein.

Many modifications and variations on the organization, amount, and/or types of data described herein will be apparent to those of ordinary skill in the art without departing from the scope and spirit of the described embodiments. For instance, in some embodiments, the inverted index 138 is replaced with a forward index. In another example, the segment mapping engine 160 can perform any number and/or types of searching, filtering, sorting, text similarity estimation techniques, any other dialogue matching operations, or any combination thereof based on the word sequence 154 and script lines instead of or in addition to the token sequence 158 and the tokenized script lines.

It will be appreciated that the system 100 shown herein is illustrative and that variations and modifications are possible. For instance, the connection topology between the various components in FIG. 1 may be modified as desired. For example, in some embodiments, the speech-to-text tool 124 is omitted from the system, and the dialogue matching application 120 transcribes audio segments in any technically feasible fashion.

Matching a Transcribed Audio Sequence to Dialog Lines

Figure 2:
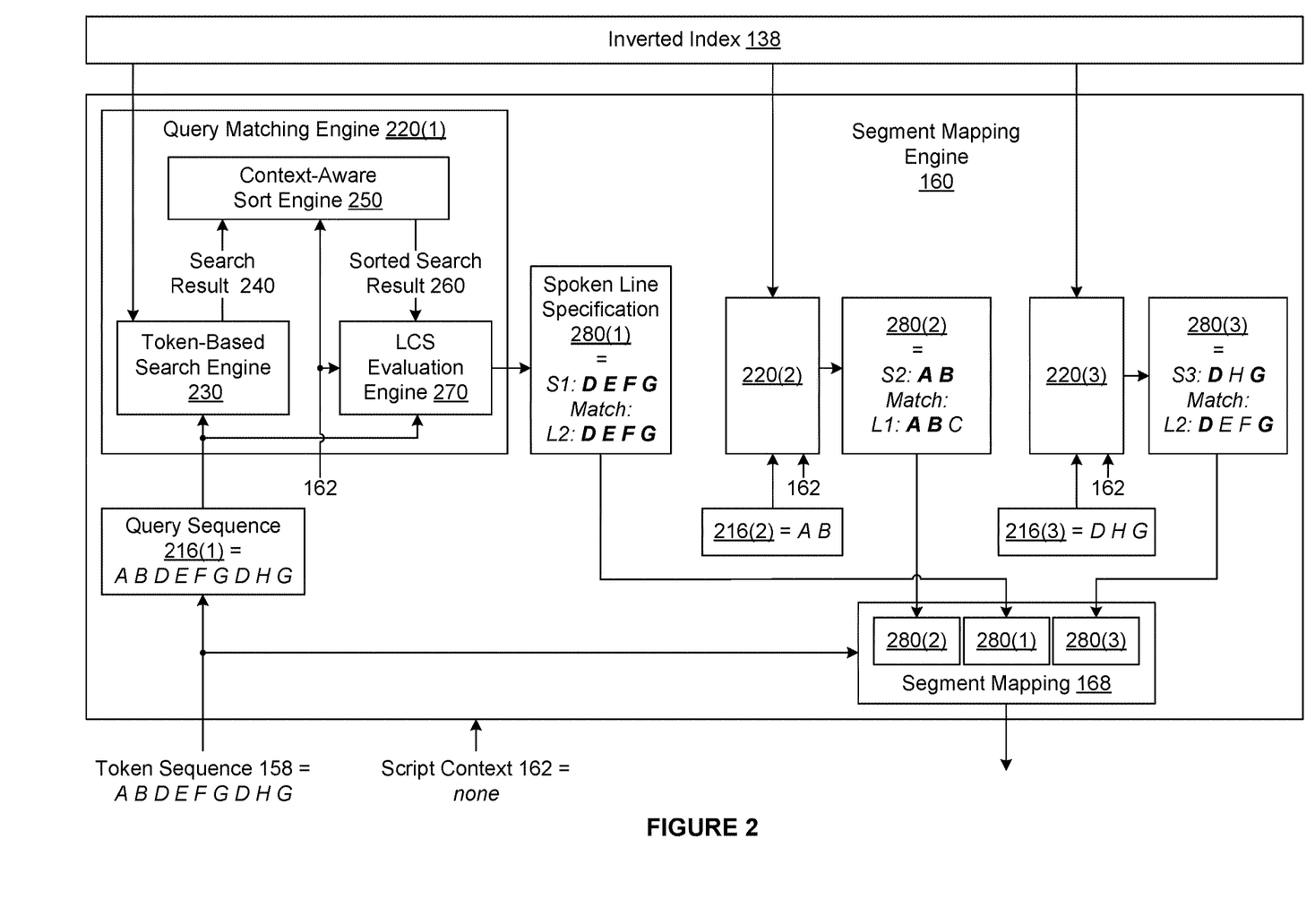
FIG. 2 is a more detailed illustration of the segment mapping engine of FIG. 1, according to various embodiments.

FIG. 2 is a more detailed illustration of the segment mapping engine 160 of FIG. 1, according to various embodiments. As shown, the segment mapping engine 160 generates the segment mapping 168 based on the token sequence 158, the inverted index 138, and the script context 162. For explanatory purposes, the segment mapping engine 160 depicted in FIG. 2 is an exemplar segment mapping application that is depicted in the context of processing the token sequence 158 that is an exemplar token sequence using the inverted index 138 that is an exemplar inverted index representing an exemplar script context.

In some embodiments, the segment mapping engine 160 recursively executes a query matching engine 220 (not explicitly shown) N different times to generate the segment mapping 168 based on the token sequence 158, the inverted index 138, and the script context 162, where N can be any integer greater than zero. For explanatory purposes, the functionality of the query matching engine 220 is described in FIG. 2 in the context of a query matching engine 220(1) that represents a first execution of the query matching engine and is depicted in detail in FIG. 2.

To initiate a recursive matching process, the segment mapping engine 160 sets a query sequence 216(1) equal to the token sequence 158. The segment mapping engine 160 then executes the query matching engine 220(1) on the query sequence 216(1), the inverted index 138, and the script context 162 to generate a spoken line specification 280(1). As shown, the query matching engine 220(1) includes, without limitation, a token-based search engine 230, a context-aware sort engine 250, and a least common subsequence (LCS) evaluation engine 270.

The token-based search engine 230 generates a search result 240 based on the query sequence 216(1). In some embodiments, the token-based search engine 230 uses a full-text search engine library (not shown) and the inverted index 138 to search for and score tokenized script lines based on relevance to the individual tokens included in the query sequence 216(1). The token-based search engine 230 generates the search result 240 that specifies any number of tokenized script lines and corresponding relevance scores. The token-based search engine 230 can implement or cause the full-text search engine library to implement any type of search algorithm to generate the search result 240.

In some embodiments, the token-based search engine 230 implements a search algorithm that estimates the relevance of a tokenized script line to the query sequence 216(1) based on the number and importance of tokens that occur in both the tokenized script line and the query sequence. More specifically, the token-based search engine 230 computes a relevance score for a tokenized script line based on the term frequency-inverse document frequency (TF-IDF) scores of each token included in the query sequence 216(1). The TF-IDF score for a tokenized script line and a token is the product of a term frequency (TF) within the tokenized script line and an inverse document frequency (TF-IDF) within all the tokenized script lines. The TF is equal to the number of repetitions of the token in the tokenized script line divided by the number of tokens in the script line. The IDT is a measure of how important the token is in the inverted index 138 and is equal to the logarithm of the total number of tokenized script lines divided by the number of tokenized script lines that contain the token.

The context-aware sort engine 250 generates a sorted search result 260 based on the search result 240 and the script context 162. As described previously herein in conjunction with FIG. 1, the script context 162 specifies the most recently spoken "matching" script line within the filtered dialogue 132 as per the last segment mapping generated by the segment mapping engine 160. The context-aware sort engine 250 can implement any number and/or types of heuristics based on the script context 162 to sort the search result 240 based, at least in part, on the script context 162.

In some embodiments, the context-aware sort engine 250 sorts the tokenized script lines specified in the search result 240 based on the proximity of the tokenized script lines to the previously matched tokenized script line specified by the script context 162 within the filtered dialogue 132 to generate the sorted search result 260. Notably, sorting the search result 240 based on proximity to the previously matched tokenized script line can increase the likelihood that multiple sequential takes of the same script line are properly matched to the script line.

As shown, the LCS evaluation engine 270 generates the spoken line specification 280(1) based on the sorted search result 260 and the script context 162. The LCS evaluation engine 270 selects the first tokenized script line included in the sorted search result 260 and computes the LCS between the query sequence 216(1) and the selected tokenized script line. The LCS evaluation engine 270 implements any number and/or types of heuristics to determine whether the selected tokenized script line matches the query sequence 216(1) based on the length and match ratio of the LCS and the script context 162.

For instance, in some embodiments, the LCS evaluation engine 270 defines a minimum match ratio based on the distance between the selected tokenized script line and the last matched tokenized script line specified by the script context 162. In some embodiments, if the selected tokenized script line is relatively far from the script context 162, then the LCS evaluation engine 270 sets the minimum match ratio to a relatively high value to reflect that the order of spoken lines in a recording session is typically similar to the order of the scripted lines in the filtered dialogue 132.

In the same or other embodiments, if the selected tokenized script line is the same as or immediately follows the last matched tokenized script line specified by the script context 162, then the LCS evaluation engine 270 sets the minimum match ratio to a relatively low value. In some embodiments, if the selected tokenized script line is less than three tokens, then the LCS evaluation engine 270 sets the minimum match ratio to 100% to enforce a perfect match.

In some embodiments, because spoken lines are generally recorded in the order in which the corresponding script lines appear in the script, the LCS evaluation engine 270 does not consider a match that involves a jump unless the confidence level is relatively high. For example, if a previous match were at script line 1 and a potential match was at script line 20, then the potential match would be associated with a jump of 19 lines ahead and unless a confidence level of the potential match was relatively high, the LCS evaluation engine 270 would disregard the potential match. More generally, the further away the potential match is from the previous match, the more accurate the LCS evaluation engine 270 requires the potential match to be for continued evaluation.

In another example, suppose that first, second, third, and twenty-fifth tokenized script lines were "ABC," "D E F," "G H I," and "G H I K L M N," respectively. Further, suppose that the last matched tokenized script line was the second script line and a query subsequence was "G H I K." In such a scenario, the likelihood that the voice actor spoke the second line (the last matched tokenized script line) immediately followed by the twenty-fifth line would be relatively low. Accordingly, although the twenty-fifth tokenized script line would be a better match to the query subsequence than the third tokenized script line, the LCS evaluation engine 270 would designate the third tokenized script line as a match for the query subsequence.

If the LCS evaluation engine 270 determines that the selected tokenized script line does not match the query sequence 216(1) and the selected tokenized script line is not the last tokenized script line in the sorted search result 260, then the LCS evaluation engine 270 selects the next tokenized script line included in the sorted search result 260. The LCS evaluation engine 270 determines whether the newly selected tokenized script line is a query sequence 216(1) based on the length and match ratio of the LCS between the newly selected tokenized script line and the query sequence 216(1) and the script context 162.

The LCS evaluation engine 270 continues to sequentially evaluate the tokenized script lines in the sorted search result 260 until determining that the selected tokenized script line matches the query sequence 216(1) or determining that none of the tokenized script lines in the sorted search result 260 match the query sequence 216(1). If the LCS evaluation engine 270 determines that none of the tokenized script lines in the sorted search result 260 match the query sequence 216(1), then the LCS evaluation engine 270 designates the query sequence 216(1) as an unmatched tokenized spoken line. The LCS evaluation engine 270 then generates spoken line specification 280(1) that includes a spoken line ID that identifies the unmatched tokenized spoken line and the unmatched tokenized spoken line.

If, however, the LCS evaluation engine 270 determines that the selected tokenized script line matches the query sequence 216(1), then the LCS evaluation engine 270 designates a contiguous sequence of tokens within the query sequence 216(1) from and including the first token in the LCS through and including the last token in the LCS as a tokenized spoken line that matches the selected tokenized script line. The LCS evaluation engine 270 then generates the spoken line specification 280(1) that includes a spoken line ID identifying the matched tokenized spoken line, the matched tokenized spoken line, a script line ID corresponding to the selected tokenized script line, and the tokenized script line.

As persons skilled in the art will recognize, a subsequence denoted as x of a sequence denoted as y is a sequence x that can be derived from the sequence y by removing zero or more elements from the sequence y without modifying the order of any of the other elements in the sequence y. Furthermore, the lowest common subsequence (LCS) of two sequences is the longest subsequence that is common to the two sequences. Importantly, the elements of the LCS do not necessarily occupy consecutive positions within the two sequences. For this reason, the LCS evaluation engine 270 can define a matched tokenized spoken line that includes tokens that are not included in the matched tokenized script line and/or omits tokens that are included in the matched tokenized script line.

If the spoken line specification 280(1) defines a tokenized spoken line that is not equal to the query sequence 216(1), then the segment mapping engine 160 generates one or two new query sequences. More specifically, if a "preceding" subsequence of one or more tokens precedes the tokenized spoken line within the query sequence 216(1), then the segment mapping engine 160 generates a new query sequence that is equal to the preceding subsequence. And if a "following" subsequence of one or more tokens follows the tokenized spoken line within the query sequence 216(1), then the segment mapping engine 160 generates a new query sequence that is equal to the following subsequence.

The segment mapping engine 160 recursively executes the query matching engine 220 on unprocessed query sequences until the query matching engine 220 has generated a different spoken line specification for each query sequence. The segment mapping engine 160 then generates the segment mapping 168 that includes each spoken line specification ordered in accordance with the token sequence 158.

For explanatory purposes, FIG. 2 depicts an exemplar embodiment of the segment mapping engine 160 that generates the segment mapping 168 based on an exemplar value of "A B C D E G F D H G" for the token sequence 158, an exemplar value of none for the script context 162, and the inverted index 138 that provides an exemplar mapping from tokens to a tokenized script line identified as L1 that is equal to "D E F G," a tokenized script line identified as L2 that is equal to "A B C," and any number of other tokenized script lines.

As shown, segment mapping engine 160 sets the query sequence 216(1) equal to "A B C D E G F D H G," and then executes the query matching engine 220(1) on the query sequence 216(1), the inverted index 138, and the script context 162 to generate the spoken line specification 280(1) that includes a spoken line ID of S1, the matched tokenized spoken line of "D E F G," a script line ID of L2, and the tokenized script line of "D E F G." As depicted in bold, all of the tokens in the matched tokenized spoken line match all of the tokens in the tokenized script line.

The segment mapping engine 160 generates a query sequence 216(2) that is equal to the subsequence "A B C" that precedes the matched tokenized spoken line of "D E F G" within the query sequence 216(1). The segment mapping engine 160 also generates a query sequence 216(3) that is equal to the subsequence "D H G" that follows the matched tokenized spoken line of "D E F G" within the query sequence 216(1).

The segment mapping engine 160 executes a query matching engine 220(2) that represent a second execution of the query matching engine 220 on the query sequence 216(2), the inverted index 138, and the script context 162 to generate the spoken line specification 280(2) that includes a spoken line ID of S2, the matched tokenized spoken line of "A B," a script line ID of L2, and the tokenized script line of "A B C." As depicted in bold, the two tokens in the matched tokenized spoken line match two of the three tokens in the tokenized script line.

The segment mapping engine 160 executes a query matching engine 220(3) that represents a third execution of the query matching engine 220 on the query sequence 216(3), the inverted index 138, and the script context 162 to generate the spoken line specification 280(3) that includes a spoken line ID of S3, the matched tokenized spoken line of "D H G," a script line ID of L1, and the tokenized script line of "D E F G." As depicted in bold, two of the three tokens in the matched tokenized spoken line match two of the four tokens in the tokenized script line.

As shown, the segment mapping engine 160 generates the segment mapping that includes, sequentially, the spoken line specification 280(2), the spoken line specification 280(1), and the spoken line specification 280(3) as per the token sequence 158.

Figure 3A:
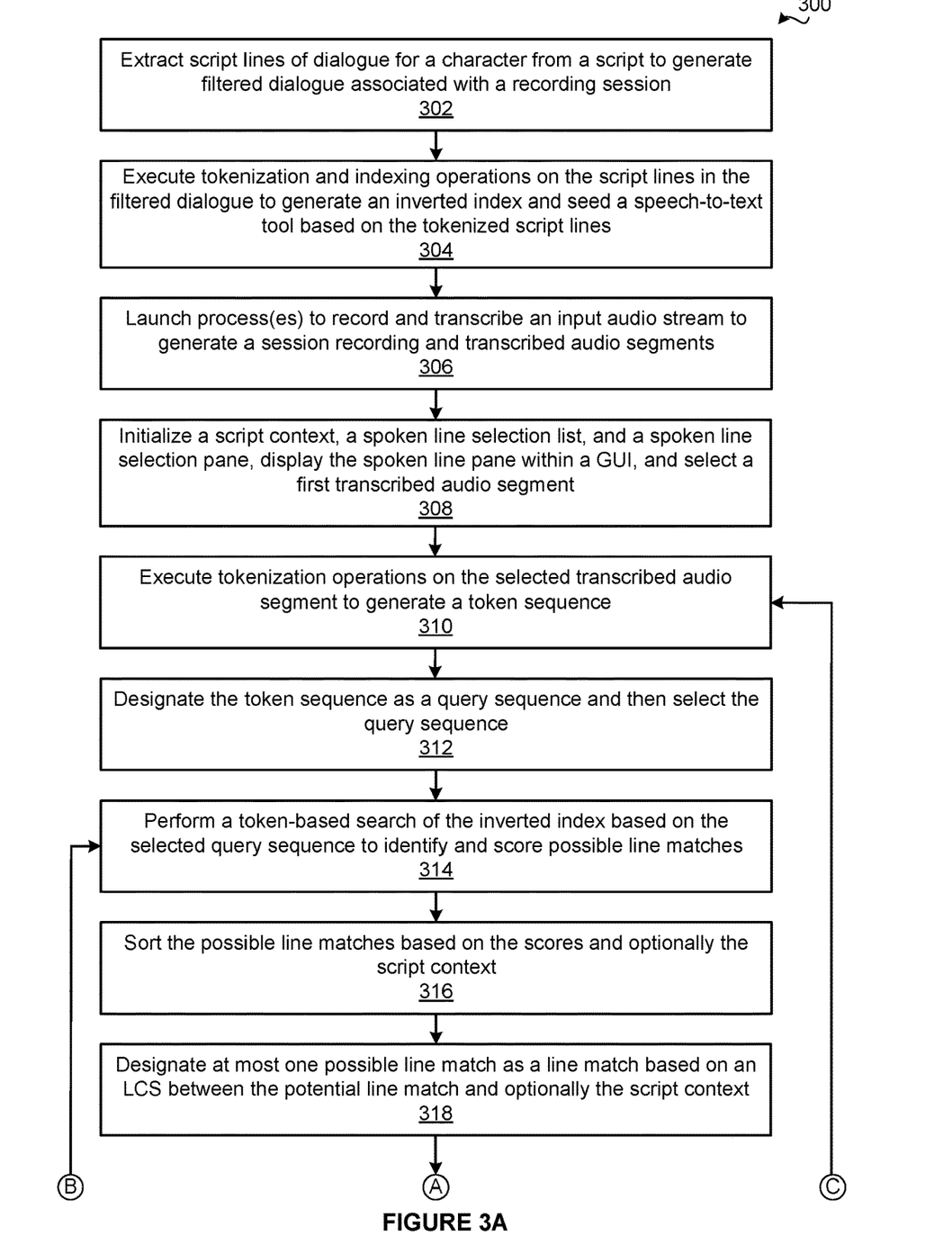
FIGS. 3A-3B set forth a flow diagram of method steps for automatically generating audio clips to include in a dialogue track, according to various embodiments.
Figure 3B:
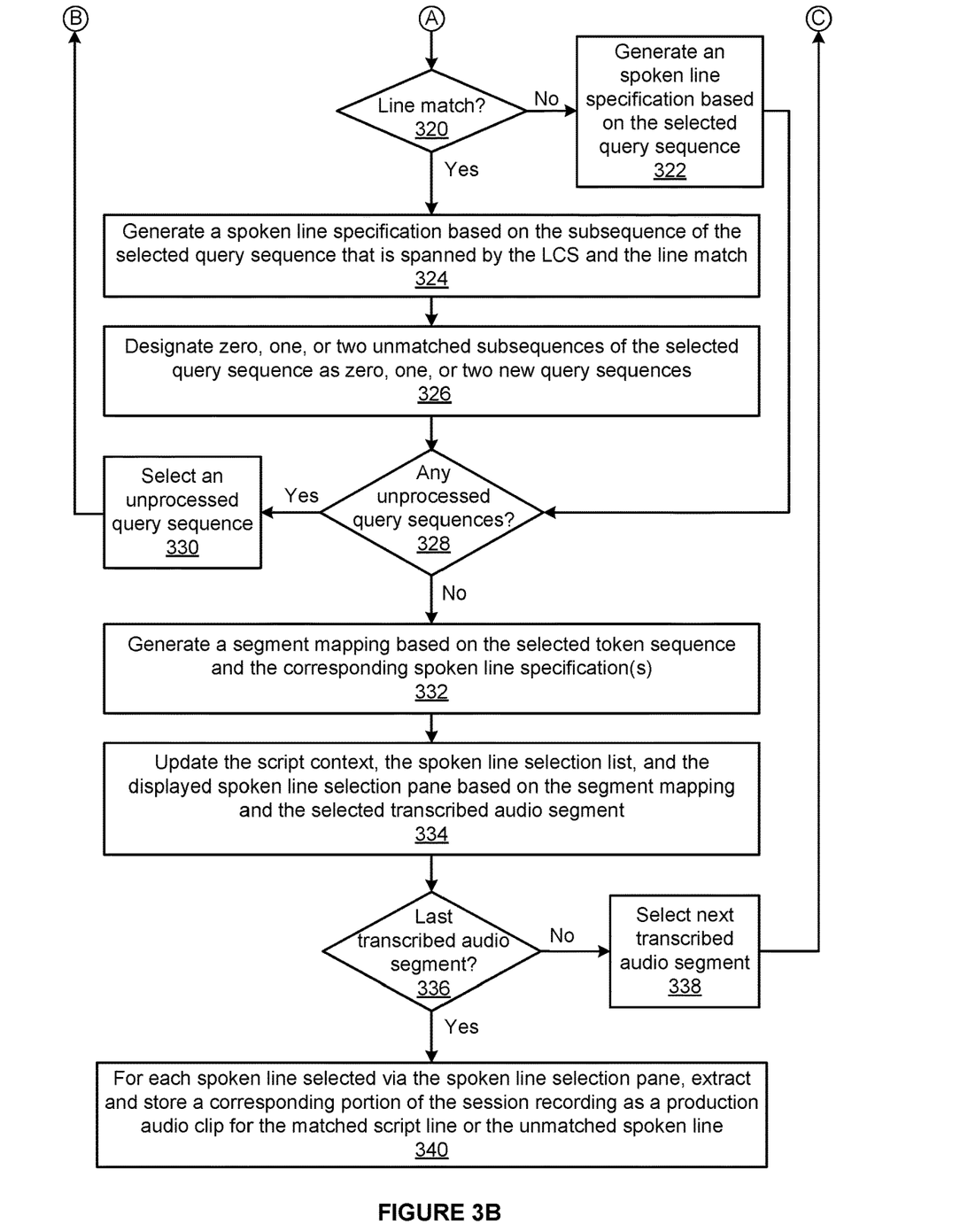

FIGS. 3A-3B set forth a flow diagram of method steps for automatically generating audio clips to include in a dialogue track, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the dialogue matching application 120 extracts script lines of dialogue for a character from a script to generate filtered dialogue associated with a recording session. At step 304, the dialogue matching application 120 executes tokenization and indexing operations on the script lines in the filtered dialogue to generate an inverted index and seeds speech-to-text tool 124 based on the tokenized script lines.

At step 306, the dialogue matching application 120 launches process(es) to record and transcribe an input audio stream 106 to generate the session recording 122 and transcribed audio segments. At step 308, the dialogue matching application 120 initializes a script context, a spoken line selection list, and a spoken line selection pane, displays the spoken line pane within the GUI 182, and selects a first transcribed audio segment. At step 310, the dialogue matching application 120 executes tokenization operations on the selected transcribed audio segment to generate a token sequence.

At step 312, the segment mapping engine 160 designates the token sequence as a query sequence and then selects the query sequence. At step 314, the query matching engine 220 performs a token-based search of the inverted index to identify and score script lines that are possible line matches to the selected query sequence. At step 316, the query matching engine 220 sorts the possible line matches based on the scores and optionally the script context.

At step 318, the query matching engine 220 designates at most one possible line match as a line match based on an LCS between the possible line match and the selected query sequence, the sorted order of the possible line match, and optionally the script context. At step 320, the query matching engine 220 determines whether a line match has been identified. If, at step 320, the query matching engine 220 determines that a line match has not been identified, then the method 300 proceeds to step 322. At step 322, the query matching engine 220 generates a spoken line specification based on the selected query sequence. The method 300 then proceeds directly to step 328.

If, however, at step 320, the query matching engine 220 determines that a line match has been identified, then the method 300 proceeds directly to step 324. At step 324, the query matching engine 220 generates a spoken line specification based on the subsequence of the selected query sequence that is spanned by the LCS and the line match. At step 326, the segment mapping engine 160 designates zero, one, or two unmatched subsequences of the selected query sequence as zero, one, or two query sequences. More specifically, if a "preceding" subsequence of one or more tokens within the selected query sequence precedes the subsequence of the selected query sequence that is spanned by the LCS within the selected query sequence, then the segment mapping engine 160 generates a query sequence that is equal to the preceding subsequence. And if a "following" subsequence of one or more tokens within the selected query sequence follows the subsequence of the selected query sequence that is spanned by the LCS, then the segment mapping engine 160 generates a query sequence that is equal to the following subsequence.

At step 328, the segment mapping engine 160 determines whether there are any unprocessed query sequences. If, at step 328, the segment mapping engine 160 determines that there is at least one unprocessed query sequence, then the method 300 proceeds to step 330. At step 330, the segment mapping engine 160 selects an unprocessed query sequence. The method 300 then returns to step 314, where the segment mapping engine 160 performs a token-based search of the inverted index based on the newly selected query sequence.

If, however, at step 328, the segment mapping engine 160 determines that there are no unprocessed query sequences, then the method 300 proceeds directly to step 332. At step 332, the segment mapping engine 160 generates a segment mapping based on the selected token sequence and the corresponding spoken line specification(s).

At step 334, the dialogue matching application 120 updates the script context, the spoken line selection list, and the displayed spoken line selection pane based on the segment mapping and the selected transcribed audio segment. At step 336, the dialogue matching application 120 determines whether the selected transcribed audio segment is the last transcribed audio segment. If, at step 336, the dialogue matching application 120 determines that the selected transcribed audio segment is not the last transcribed audio segment, then the method 300 proceeds to step 338. At step 338, the dialogue matching application 120 selects the next transcribed audio segment. The method 300 then returns to step 310, where the dialogue matching application 120 executes tokenization and indexing operations on the newly selected transcribed audio segment to generate a token sequence.

If, however, at step 336, the dialogue matching application 120 determines that the selected transcribed audio segment is the last transcribed audio segment, then the method 300 proceeds directly to step 340. At step 340, for each spoken line selected via the spoken line selection pane, the dialogue matching application 120 extracts and stores a corresponding portion of the session recording 122 as a production audio clip for the matched script line or the corresponding unmatched spoken line. The method 300 then terminates.

Figure 4:
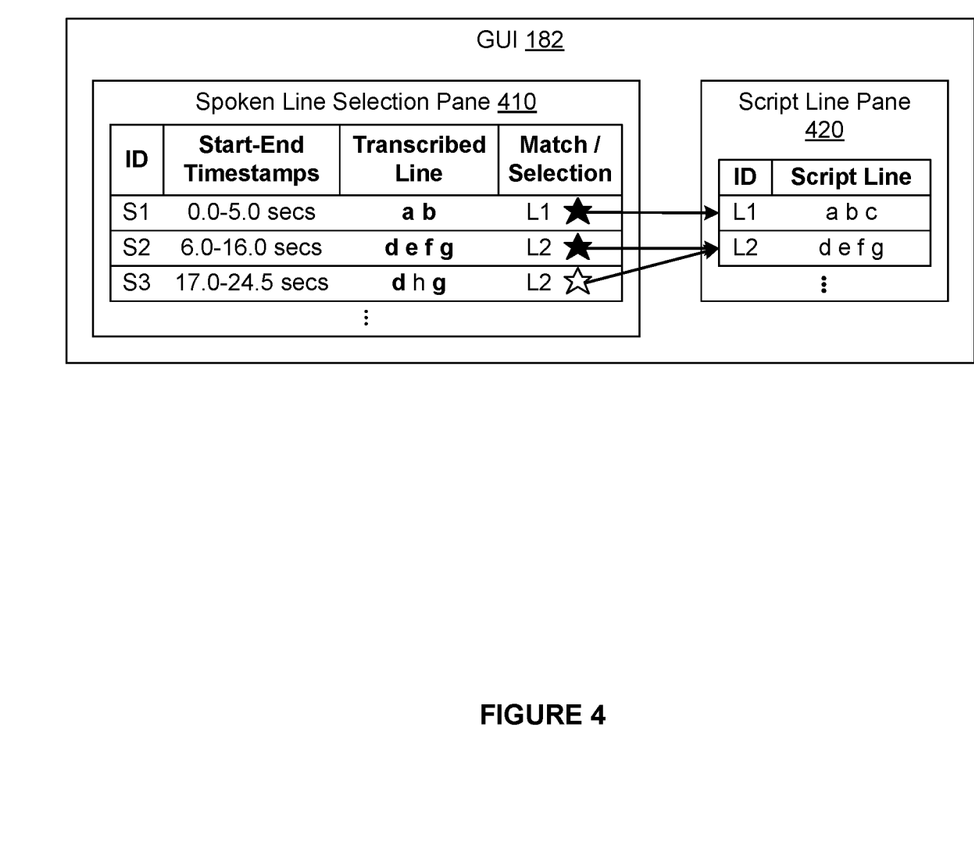
FIG. 4 is a more detailed illustration of the graphical user interface (GUI) of FIG. 1, according to various embodiments.

FIG. 4 is a more detailed illustration of the GUI 182 of FIG. 1, according to various embodiments. More specifically, the GUI 182 depicted in FIG. 4 is an exemplar GUI. It will be appreciated that the GUI 182 shown herein is illustrative and that many variations and modifications are possible.

As shown, the GUI 182 includes, without limitation, a spoken line selection pane 410 and a script line pane 420. The spoken line selection pane 410 visually illustrates transcriptions and associated metadata for the spoken lines identified as S1, S2, and S3 corresponding to the spoken line specification 280(1), the spoken line specification 280(2), and the spoken line specification 280(3), respectively, described previously herein in conjunction with FIG. 2. In FIG. 4, letters a-h denote words corresponding to the tokens denoted by A-H, respectively, in FIG. 2. Two filled black stars indicate selected dialogue matches (visually illustrated via two arrows) and an unfilled star indicates a dialogue match (visually illustrated via a single arrow) that is not selected.

In sum, the disclosed techniques can be used to automatically extract audio clips from a session recording for inclusion in a dialogue track of an animated film. In some embodiments, a dialogue matching application extracts script lines spoken by a character from a script of the animated film to generate filtered dialogue. The dialogue matching application performs tokenization and indexing operations on the script lines in the filtered dialogue to generate an inverted index. The dialogue matching application records an input audio stream to generate a stream recording and configures a speech-to-text tool to transcribe the input audio stream to generate transcribed audio segments. Each transcribed audio segment includes a word sequence, a word start timestamp, and a word end timestamp.

The dialogue matching application initializes a spoken line selection list to an empty list, displays the spoken line selection list within a GUI, and initializes a script context to none. The spoken line selection list includes any number of spoken line descriptions, where each spoken line description includes a spoken line ID, a transcribed spoken line, start and end timestamps, a matched script line ID (either a line number or none), and a selection flag. The spoken line selection pane allows users to view the spoken line descriptions and select any number of the spoken lines. The script context identifies the last matched script line spoken during the last audio segment processed by the dialogue matching application.

Upon generating a new transcribed audio segment, the dialogue matching application performs tokenization operations on the word sequence included in the transcribed audio segment to generate a corresponding token sequence. The dialogue matching application then executes a segment mapping engine on the token sequence, the inverted index, and the script context to generate a segment mapping. The segment mapping engine sets a query sequence equal to the token sequence and executes a query matching engine on the query sequence, the inverted index, and the script context. The query matching engine performs a token-based search of the inverted index to identify and score script lines that are possible line matches to the query sequence. The query matching engine filters and sorts the possible line matches based on the scores and the script context.

Subsequently, the query matching engine selects the first remaining possible line match and computes a longest common subsequence (LCS) between the query sequence and the selected possible line match. The query matching engine determines whether the selected possible line match is a line match based on the length and match ratio of the LCS and the script context. If the query matching engine determines that the selected possible line match is not a line match, then the query matching engine selects and evaluates the next remaining possible line match. The query matching engine continues in this fashion until determining that the selected possible line match is a match or determining that none of the remaining possible line matches is a line match.

If the query matching engine determines that a script line is a line match, then the query matching engine generates a spoken line specification based on the subsequence of the selected query sequence that is spanned by the LCS and the line match. Subsequently, the segment mapping engine generates zero, one, or two new query sequences depending on whether one or more tokens precede and/or one or more tokens follow the matched line within the query sequence. If, however, the query matching engine determines that none of the script lines is a line match, then the segment mapping engine generates a spoken line specification based on the query sequence and does not generate any new query sequences.

After recursively executing the query matching engine for each new query sequence, the segment mapping engine generates a segment mapping that includes the spoken line specification(s) ordered in accordance with the token sequence. Subsequently, the dialogue matching application updates the script context. the spoken line selection list, and the displayed spoken line selection pane to reflect the segment mapping. On-demand or after the recording session, the dialogue matching application extracts and stores a corresponding portion of the session recording as a different production audio clip for each transcribed spoken line that is selected via the GUI. Notably, the dialogue matching application implements a file-naming convention to indicate the matched script lines for the audio clips.

At least one technical advantage of the disclosed techniques relative to the prior art is that, with the disclosed techniques, the amount of time required to extract production audio clips from a session recording can be substantially reduced. In that regard, the disclosed techniques enable a user to designate a production take during a recording session simply by selecting transcribed spoken lines that are automatically matched to actual script lines and displayed within a graphical user interface. Because each transcribed spoken line is derived from a different portion of the session recording, a production audio clip for the corresponding script line can be automatically and efficiently generated. Another advantage of the disclosed techniques is that, because production takes are precisely and directly tracked within the session recording via selections of transcribed spoken lines, the likelihood that any production take is misidentified is substantially decreased relative to prior art techniques. Consequently, the quality of the dialogue track can be improved relative to what can usually be achieved using conventional techniques. These technical advantages provide one or more technological improvements over prior art approaches.

1. In some embodiments, a computer-implemented method for automatically generating audio clips comprises performing one or more speech recognition operations on a first audio segment to generate a first sequence of words; determining a first dialogue match between a first subsequence of words included in the first sequence of words and a first script line included in a plurality of script lines; determining a second dialogue match between a second subsequence of words included in the first sequence of words and the first script line; receiving, via a graphical user interface (GUI), a first event that corresponds to a first interaction between a user and a first interactive GUI element; extracting a first portion of the first audio segment from a session recording based on the first event, wherein the first portion of the first audio segment corresponds to either the first subsequence of words or the second subsequence of words; and generating a first audio clip that corresponds to the first script line based on the first portion of the first audio segment.

2. The computer-implemented method of clause 1, further comprising displaying at least the first interactive GUI element within the GUI to visually indicate both the first dialogue match and the second dialogue match.

3. The computer-implemented method of clauses 1 or 2, wherein the first portion of the first audio segment is associated with the second subsequence of words.

4. The computer-implemented method of any of clauses 1-3, wherein the first event indicates that the second subsequence of words corresponds to a take that is selected for inclusion in a dialogue track.

5. The computer-implemented method of any of clauses 1-4, wherein determining the first dialogue match comprises performing one or more tokenization operations on the first sequence of words to generate a first sequence of tokens; and executing a search engine on the first sequence of tokens and an inverted index that is derived from the plurality of script lines to generate a list of tokenized script lines associated with a list of relevance scores.

6. The computer-implemented method of any of clauses 1-5, wherein determining the first dialogue match comprises sorting the list of tokenized script lines based on at least one of a proximity to a previously matched script line or the list of relevance scores to generate a sorted list of tokenized script lines.

7. The computer-implemented method of any of clauses 1-6, further comprising performing one or more tokenization operations on the plurality of script lines to generate a plurality of tokenized script lines; and generating an inverted index based on the plurality of tokenized script lines, wherein the inverted index stores a mapping between a plurality of tokens and the plurality of tokenized script lines.

8. The computer-implemented method of any of clauses 1-7, wherein determining the first dialogue match comprises computing a least common subsequence between a first sequence of tokens derived from the first sequence of words and a first tokenized script line derived from the first script line; and determining that a first subsequence of tokens included in the first sequence of tokens matches the first tokenized script line based on the least common subsequence.

9. The computer-implemented method of any of clauses 1-8, wherein extracting the first portion of the first audio segment from the session recording comprises determining that the first event indicates a user selection of the second subsequence of words; setting a first timestamp equal to a start timestamp associated with a first word included in the second subsequence of words; setting a second timestamp equal to an end timestamp associated with a last word included in the second subsequence of words; and generating a copy of a portion of the session recording that starts at the first timestamp and ends at the second timestamp.

10. The computer-implemented method of any of clauses 1-9, further comprising filtering a script based on a first character to generate the plurality of script lines.

11. In some embodiments, one or more non-transitory computer readable media include instructions that, when executed by one or more processors, cause the one or more processors to automatically generate audio clips by performing the steps of performing one or more speech recognition operations on a first audio segment to generate a first sequence of words; determining a first dialogue match between a first subsequence of words included in the first sequence of words and a first script line included in a plurality of script lines; determining a second dialogue match between a second subsequence of words included in the first sequence of words and the first script line; receiving, via a graphical user interface (GUI), a first event that corresponds to a first interaction between a user and a first interactive GUI element; extracting a first portion of the first audio segment from a session recording based on the first event, wherein the first portion of the first audio segment corresponds to either the first subsequence of words or the second subsequence of words; and generating a first audio clip that corresponds to the first script line based on the first portion of the first audio segment.

12. The one or more non-transitory computer readable media of clause 11, further comprising displaying at least the first interactive GUI element within the GUI to visually indicate both the first dialogue match and the second dialogue match.

13. The one or more non-transitory computer readable media of clauses 11 or 12, wherein the first portion of the first audio segment is associated with the second subsequence of words.

14. The one or more non-transitory computer readable media of any of clauses 11-13, wherein the first event indicates that the second subsequence of words corresponds to a take that is selected for inclusion in a dialogue track.

15. The one or more non-transitory computer readable media of any of clauses 11-14, wherein determining the first dialogue match comprises performing one or more tokenization operations on the first sequence of words to generate a first sequence of tokens; and executing a search engine on the first sequence of tokens and an inverted index that is derived from the plurality of script lines to generate a list of tokenized script lines associated with a list of relevance scores.

16. The one or more non-transitory computer readable media of any of clauses 11-15, wherein the one or more tokenization operations comprise at least one of a lowercasing operation, a stemming operation, or a filtering operation.

17. The one or more non-transitory computer readable media of any of clauses 11-16, further comprising performing one or more tokenization operations on the plurality of script lines to generate a plurality of tokenized script lines; and generating an inverted index based on the plurality of tokenized script lines, wherein the inverted index stores a mapping between a plurality of tokens and the plurality of tokenized script lines.

18. The one or more non-transitory computer readable media of any of clauses 11-17, wherein the second subsequence of words either precedes or follows the first subsequence of words within the first sequence of words.

19. The one or more non-transitory computer readable media of any of clauses 11-18, wherein generating the first audio clip comprises determining a filename based on a first line number associated with the first script line; and storing the first portion of the first audio segment in an audio file identified by the filename.

20. In some embodiments, a system comprises one or more memories storing instructions and one or more processors coupled to the one or more memories that, when executing the instructions, perform the steps of performing one or more speech recognition operations on a first audio segment to generate a first sequence of words; determining a first dialogue match between a first subsequence of words included in the first sequence of words and a first script line included in a plurality of script lines; determining a second dialogue match between a second subsequence of words included in the first sequence of words and the first script line; receiving, via a graphical user interface (GUI), a first event that corresponds to a first interaction between a user and a first interactive GUI element; extracting a first portion of the first audio segment from a session recording based on the first event, wherein the first portion of the first audio segment corresponds to either the first subsequence of words or the second subsequence of words; and generating a first audio clip that corresponds to the first script line based on the first portion of the first audio segment.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating audio clips, the method comprising:
    performing one or more speech recognition operations on a first audio segment to generate a first sequence of words spoken in the first audio segment;
    determining a first dialogue match between a first subsequence of words included in the first sequence of words spoken in the first audio segment and a first script line included in a plurality of script lines;
    determining a second dialogue match between a second subsequence of words included in the first sequence of words spoken in the first audio segment and the first script line;
    receiving, via a graphical user interface (GUI), a first event that corresponds to a first interaction between a user and a first interactive GUI element;
    extracting a first portion of the first audio segment from a session recording based on the first event, wherein the first portion of the first audio segment corresponds to either the first subsequence of words or the second subsequence of words; and generating a first audio clip that corresponds to the first script line based on the first portion of the first audio segment.

2. The computer-implemented method of claim 1, further comprising displaying at least the first interactive GUI element within the GUI to visually indicate both the first dialogue match and the second dialogue match.

3. The computer-implemented method of claim 1, wherein the first portion of the first audio segment is associated with the second subsequence of words.

4. The computer-implemented method of claim 1, wherein the first event indicates that the second subsequence of words corresponds to a take that is selected for inclusion in a dialogue track.

5. The computer-implemented method of claim 1, wherein determining the first dialogue match comprises:
  performing one or more tokenization operations on the first sequence of words to generate a first sequence of tokens; and
  executing a search engine on the first sequence of tokens and an inverted index that is derived from the plurality of script lines to generate a list of tokenized script lines associated with a list of relevance scores.

6. The computer-implemented method of claim 5, wherein determining the first dialogue match comprises sorting the list of tokenized script lines based on at least one of a proximity to a previously matched script line or the list of relevance scores to generate a sorted list of tokenized script lines.

7. The computer-implemented method of claim 1, further comprising:
  performing one or more tokenization operations on the plurality of script lines to generate a plurality of tokenized script lines; and
  generating an inverted index based on the plurality of tokenized script lines, wherein the inverted index stores a mapping between a plurality of tokens and the plurality of tokenized script lines.

8. The computer-implemented method of claim 1, wherein determining the first dialogue match comprises:
  computing a least common subsequence between a first sequence of tokens derived from the first sequence of words and a first tokenized script line derived from the first script line; and
  determining that a first subsequence of tokens included in the first sequence of tokens matches the first tokenized script line based on the least common subsequence.

9. The computer-implemented method of claim 1, wherein extracting the first portion of the first audio segment from the session recording comprises:
  determining that the first event indicates a user selection of the second subsequence of words;
  setting a first timestamp equal to a start timestamp associated with a first word included in the second subsequence of words;
  setting a second timestamp equal to an end timestamp associated with a last word included in the second subsequence of words; and
  generating a copy of a portion of the session recording that starts at the first timestamp and ends at the second timestamp.

10. The computer-implemented method of claim 1, further comprising filtering a script based on a first character to generate the plurality of script lines.

11. One or more non-transitory computer readable media including instructions that, when executed by one or more processors, cause the one or more processors to automatically generate audio clips by performing the steps of:
  performing one or more speech recognition operations on a first audio segment to generate a first sequence of words spoken in the first audio segment;
  determining a first dialogue match between a first subsequence of words included in the first sequence of words spoken in the first audio segment and a first script line included in a plurality of script lines;
  determining a second dialogue match between a second subsequence of words included in the first sequence of words spoken in the first audio segment and the first script line;
  receiving, via a graphical user interface (GUI), a first event that corresponds to a first interaction between a user and a first interactive GUI element;
  extracting a first portion of the first audio segment from a session recording based on the first event, wherein the first portion of the first audio segment corresponds to either the first subsequence of words or the second subsequence of words; and
  generating a first audio clip that corresponds to the first script line based on the first portion of the first audio segment.

12. The one or more non-transitory computer readable media of claim 11, further comprising displaying at least the first interactive GUI element within the GUI to visually indicate both the first dialogue match and the second dialogue match.

13. The one or more non-transitory computer readable media of claim 11, wherein the first portion of the first audio segment is associated with the second subsequence of words.

14. The one or more non-transitory computer readable media of claim 11, wherein the first event indicates that the second subsequence of words corresponds to a take that is selected for inclusion in a dialogue track.

15. The one or more non-transitory computer readable media of claim 11, wherein determining the first dialogue match comprises:
  performing one or more tokenization operations on the first sequence of words to generate a first sequence of tokens; and
  executing a search engine on the first sequence of tokens and an inverted index that is derived from the plurality of script lines to generate a list of tokenized script lines associated with a list of relevance scores.

16. The one or more non-transitory computer readable media of claim 15, wherein the one or more tokenization operations comprise at least one of a lower-casing operation, a stemming operation, or a filtering operation.

17. The one or more non-transitory computer readable media of claim 11, further comprising:
  performing one or more tokenization operations on the plurality of script lines to generate a plurality of tokenized script lines; and
  generating an inverted index based on the plurality of tokenized script lines, wherein the inverted index stores a mapping between a plurality of tokens and the plurality of tokenized script lines.

18. The one or more non-transitory computer readable media of claim 11, wherein the second subsequence of words either precedes or follows the first subsequence of words within the first sequence of words.

19. The one or more non-transitory computer readable media of claim 11, wherein generating the first audio clip comprises:

determining a filename based on a first line number associated with the first script line; and storing the first portion of the first audio segment in an audio file identified by the filename.

20. A system comprising:
one or more memories storing instructions; and
one or more processors coupled to the one or more memories that, when executing the instructions, perform the steps of:
  performing one or more speech recognition operations on a first audio segment to generate a first sequence of words spoken in the first audio segment;
  determining a first dialogue match between a first subsequence of words included in the first sequence of words spoken in the first audio segment and a first script line included in a plurality of script lines;
  determining a second dialogue match between a second subsequence of words included in the first sequence of words spoken in the first audio segment and the first script line;
  receiving, via a graphical user interface (GUI), a first event that corresponds to a first interaction between a user and a first interactive GUI element;
  extracting a first portion of the first audio segment from a session recording based on the first event, wherein the first portion of the first audio segment corresponds to either the first subsequence of words or the second subsequence of words; and
  generating a first audio clip that corresponds to the first script line based on the first portion of the first audio segment.

* * * * *